(12) United States Patent
Aida

(10) Patent No.: US 9,258,672 B2
(45) Date of Patent: Feb. 9, 2016

(54) SHORT-RANGE WIRELESS COMMUNICATION DEVICE

(71) Applicant: DENSO CORPORATION, Kariya, Aichi-pref. (JP)

(72) Inventor: Toshiyuki Aida, Anjo (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 14/403,532

(22) PCT Filed: Apr. 17, 2013

(86) PCT No.: PCT/JP2013/002603
§ 371 (c)(1),
(2) Date: Nov. 24, 2014

(87) PCT Pub. No.: WO2013/179555
PCT Pub. Date: Dec. 5, 2013

(65) Prior Publication Data
US 2015/0105020 A1 Apr. 16, 2015

(30) Foreign Application Priority Data

May 29, 2012 (JP) .................................. 2012-121924

(51) Int. Cl.
*H04B 7/00* (2006.01)
*H04W 4/00* (2009.01)
(Continued)

(52) U.S. Cl.
CPC ............... *H04W 4/008* (2013.01); *H04L 67/10* (2013.01); *H04M 1/6091* (2013.01); *H04M 1/72519* (2013.01); *H04M 2250/04* (2013.01)

(58) Field of Classification Search
CPC ... H04W 4/008; H04W 4/02; H04W 52/0251; H04W 88/04; H04W 8/22
USPC .......................... 455/41.2, 41.3, 566; 345/360
See application file for complete search history.

(56) References Cited

U.S. PATENT DOCUMENTS 8,831,642 B2 * 9/2014 Moldavsky et al. ........ 455/456.3
8,855,557 B2 * 10/2014 Moosavi ...................... 455/41.1
(Continued)

FOREIGN PATENT DOCUMENTS

JP 2000151702 A 5/2000
JP 2010-250376 * 11/2006 ............. G01C 21/00
(Continued)

OTHER PUBLICATIONS

International Search Report and Written Opinion (in Japanese with English Translation) for PCT/JP2013/002603, mailed May 28, 2013; ISA/JP.

*Primary Examiner* — Nay A Maung
*Assistant Examiner* — Angelica M Perez
(74) *Attorney, Agent, or Firm* — Harness, Dickey & Pierce, P.L.C.

(57) ABSTRACT

A short-range wireless communication device, utilized with a communication partner terminal that executes a cooperative application while switching between foreground and background operations when a predetermined protocol is established between the communication partner terminal and the short-range wireless communication device, and disconnects a protocol by changing the cooperative application from the foreground operation to the background operation, includes: a control device that determines whether a condition of returning the cooperative application from the background operation to the foreground operation is satisfied, determines whether the cooperative application returns to the foreground operation according to an operating status of an application in the communication partner terminal when the condition is satisfied, and transmits a request for establishment of the protocol to the communication partner terminal when the cooperative application returns to the foreground operation. When the cooperative application does not return to the foreground operation, the control device repeatedly acquires the operating status.

11 Claims, 4 Drawing Sheets

(51) Int. Cl.
*H04M 1/725* (2006.01)
*H04L 29/08* (2006.01)
*H04M 1/60* (2006.01)

(56) References Cited

U.S. PATENT DOCUMENTS

2006/0240778 A1\* 10/2006 Yuki et al. .................... 455/41.2
2006/0258406 A1\* 11/2006 Igarashi et al. ............... 455/567
2008/0021837 A1     1/2008 Chang et al.
2009/0253466 A1    10/2009 Saito et al.

FOREIGN PATENT DOCUMENTS

| JP | 2006310924 A | 11/2006 |
| JP | 2006319572 A | 11/2006 |
| JP | 2008027451 A | 2/2008 |
| JP | 2009253601 A | 10/2009 |
| JP | 2010250376 A | 11/2010 |
| JP | 2011147019 A | 7/2011 |

\* cited by examiner

SHORT-RANGE WIRELESS COMMUNICATION DEVICE

CROSS REFERENCE TO RELATED APPLICATIONS

This application is a U.S. National Phase Application under 35 U.S.C. 371 of International Application No. PCT/JP2013/002603 filed on Apr. 17, 2013 and published in Japanese as WO 2013/179555 A1 on Dec. 5, 2013. This application is based on and claims the benefit of priority from Japanese Patent Application No. 2012-121924 filed on May 29, 2012. The entire disclosures of all of the above applications are incorporated herein by reference.

TECHNICAL FIELD

The present disclosure relates to a short-range wireless communication device used together with a communication partner terminal that can execute a cooperative application providing a service in cooperation with the short range wireless communication device while switching between a foreground operation and a background operation in a state where a given protocol is established between the communication partner terminal and the short-range wireless communication device.

BACKGROUND ART

Up to now, for example, a vehicle communication system is provided in which a mobile communication terminal called "smart phone" portable by a user, and a short-range wireless communication device mounted in a vehicle establish a given protocol therebetween to provide a service in cooperation with each other. For example, the vehicle communication system provides a service in which the mobile communication terminal transfers voice data of an Internet radio received from a server to the short-range wireless communication device, and the short-range wireless communication device outputs the voice data transferred from the mobile communication terminal. Also, for example, Patent Literature 1 discloses a configuration in which those applications can be executed while switching between a foreground operation and a background operation in the mobile communication terminal.

Incidentally, when the mobile communication terminal of this type is used to provide a service in cooperation with the short-range wireless communication device, if the cooperative application running in the foreground operation changes to the background operation, even if the cooperative application is not finished, the provision of the service may be interrupted. Thereafter, in the mobile communication terminal, if a condition in which the cooperative application changed to the background operation returns to the foreground operation is fulfilled, the cooperative application changed to the background operation returns to the foreground operation. However, the provision of the service may not resume in spite of a fact that the cooperative application changed to the background operation returns to the foreground operation.

PRIOR ART LITERATURES

Patent Literature

Patent Literature 1: JP-A-2011-147019

SUMMARY OF INVENTION

It is an object of the present disclosure to provide a short-range wireless communication device that can appropriately resume the provision of a service when a cooperative application returns to a foreground operation after the cooperative application running in the foreground operation in a communication partner terminal changes to a background operation to interrupt the provision of the service.

According to a first aspect of the present disclosure, a short-range wireless communication device is utilized together with a communication partner terminal that executes a cooperative application for providing a service in cooperation with the short-range wireless communication device while switching between a foreground operation and a background operation in a state where a predetermined protocol is established between the communication partner terminal and the short-range wireless communication device, and disconnects a predetermined established protocol by changing the cooperative application running in the foreground operation to the background operation. The short-range wireless communication device includes a control device that determines whether a condition having a possibility of returning the cooperative application changed to the background operation to the foreground operation in the communication partner terminal is satisfied, determines whether the cooperative application returns to the foreground operation according to an operating status of an application in the communication partner terminal when the control device determines that the condition is satisfied, the operating status being acquired from the communication partner terminal, and transmits a request for establishment of the predetermined protocol to the communication partner terminal through an establishment request transmission device when the control device determines that the cooperative application returns to the foreground operation. When the control device determines that the cooperative application does not return to the foreground operation, the control device repeatedly acquires the operating status from the communication partner terminal.

In the short-range communication apparatus, there is a case in which the condition that the cooperative application changed to the background operation is liable to return to the foreground operation in the communication partner terminal is satisfied, but the cooperative application does not really return to the foreground operation in the communication partner terminal. To cope with the above situation, when it is determined that the cooperative application does not return to the foreground operation, the operating status of the application is repetitively acquired in the communication partner terminal. As a result, a change for determining whether the cooperative application returns to the foreground operation, or not, can increase. With an increase in a chance for determination as described above, when the cooperative application really returns to the foreground operation, it can be determined that the cooperative application returns to the foreground operation. In addition, a request for establishment of the given protocol is transmitted to the communication partner terminal to again establish the given disconnected protocol, as a result of which the provision of the service by the cooperative application can appropriately resume.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
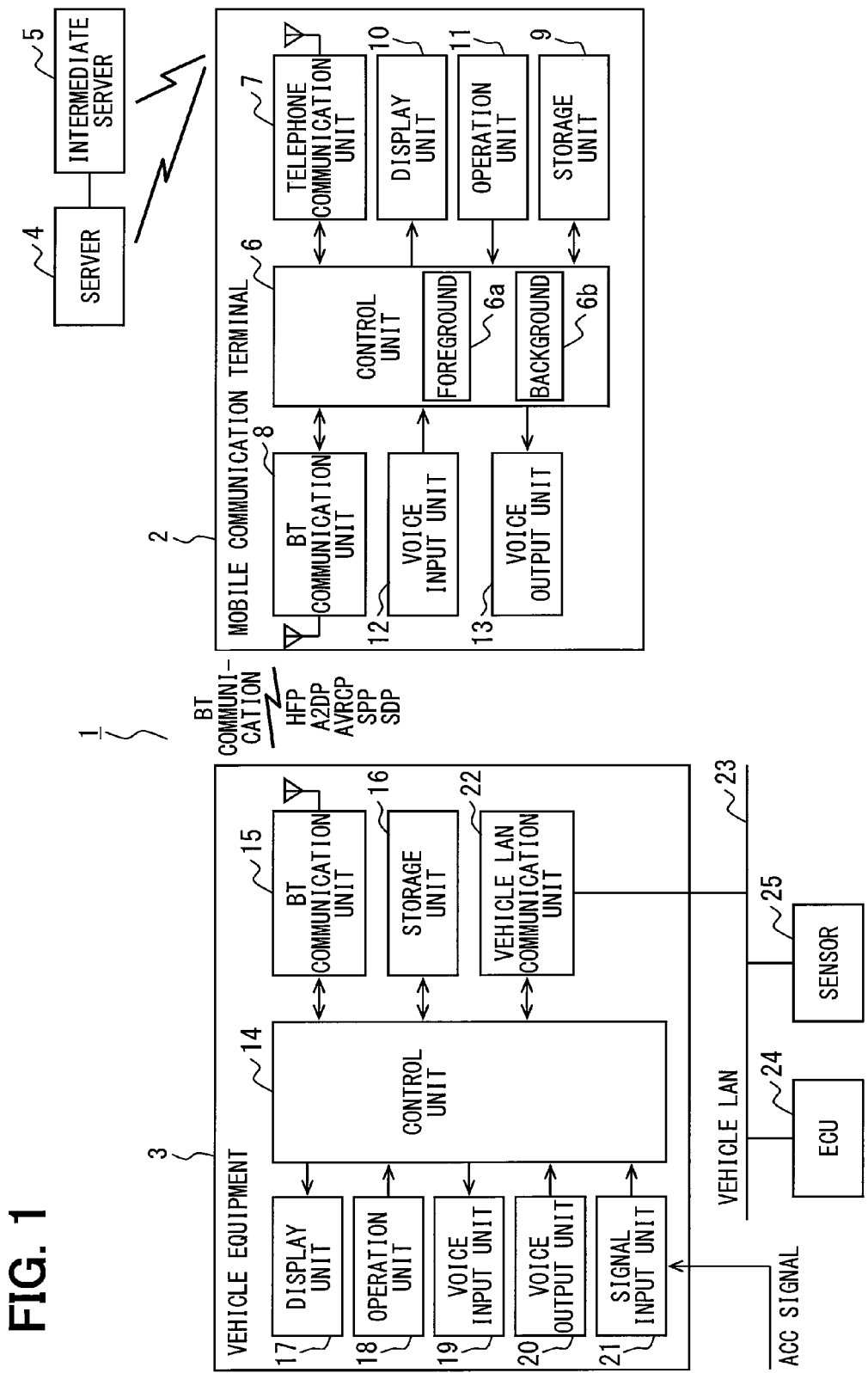
FIG. 1 is a functional block diagram illustrating an embodiment of this disclosure.

Hereinafter, a description will be given of a short-range wireless communication device that enables a Bluetooth (registered trademark, hereinafter referred to merely as "BT") communication with a mobile communication terminal portable by a user, and is applied to a vehicle equipment mounted in a vehicle according to an embodiment of the present invention with reference to the drawings. As illustrated in FIG. 1, a vehicle communication system 1 includes a mobile communication terminal 2 (corresponding to a communication partner terminal) portable by a user, and a vehicle equipment 3 mounted in a vehicle. In this embodiment, it is assumed that the mobile communication terminal 2 is a so-called smart phone (smart phone) advanced in higher performance in recent years. The mobile communication terminal 2 is connected to a server 4 or an intermediate server 5 which are managed by, for example, a content provider over a communication network (not shown) to acquire a content delivered from the server 4 directly or through the intermediate server 5. The communication network includes a facility that provides a cellular phone communication service using a known public network such as a cellular phone base station and a base station control device.

The server 4 retains various content that realizes a POI (point of interface) search service, a news distribution service, an SNS (social networking service) service, a music streaming distribution service, or an Internet radio distribution service. Upon receiving a distribution request from the mobile communication terminal 2, the server 4 distributes the content specified by the received distribution request to the mobile communication terminal 2 over the communication network. The intermediate server 5 has a function of converting a data format of the content distributed from the server 4 into a data format with which enables the vehicle equipment 3 can use the content. That is, the content requiring no conversion of the data format such as the music streaming data is distributed directly to the mobile communication terminal 2 from the server 4. On the other hand, the content requiring the conversion of the data format such as the POI data or the news data is distributed to the mobile communication terminal 2 from the server 4 through the intermediate server 5.

The mobile communication terminal 2 includes a control unit 6, a telephone communication unit 7, a BT communication unit 8, a storage unit 9, a display unit 10, an operation unit 11, a voice input unit 12, and a voice output unit 13. The control unit 6 includes a known microcomputer having a CPU, a RAM, a ROM, and an I/O bus. The control unit 6 executes a computer program stored in the ROM or the like to control the overall operation of the mobile communication terminal 2 such as data communication processing or data management processing.

The telephone communication unit 7 conducts a telephone communication (including a voice communication or a data communication) with the server 4 or the intermediate server 5 over the communication network. The BT communication unit 8 can connect a BT communication line as a short-range wireless communication line to a BT communication unit 15 of the vehicle equipment 3 which will be described later, and conducts a BT communication in a connection state of the BT communication line. The BT communication unit 8 is configured to enable simultaneous connection of plural profiles (so-called multi-profile connection) defined by the communication standard of the BT. Those plural profiles mean protocols defined for each of functions. In this case, the profiles include an HFP (hands-free profile) that defines hands-free calling, an A2DP (advanced audio distribution profile) that defines the transfer of music data, an AVRCP (audio/video remote control profile) that defines the transfer of control data related to control of the music data, an SPP (serial port profile) that defines the data communication of a virtual serial port, and an SDP (service discovery profile) that searches which application the mobile communication terminal 2 supports (executed by a foreground operation (FG) 6a which will be described later).

The storage unit 9 has a storage area that stores various pieces of data therein. The storage unit 9 may be configured by a storage medium detachable from the mobile communication terminal 3 such as a memory card.

The display unit 10 is configured by, for example, a liquid crystal display or an organic EL display, and displays various information on the basis of a display instruction signal input from the control unit 6. The operation unit 11 includes a so-called touch panel which is touch switches formed on a display screen of the display unit 10, and various operation keys including switches mechanically disposed around or in the vicinity of the display unit 10. The operation unit 11 outputs an operation detection signal to the control unit 6 in response to user's operation of the operation keys. The control unit 6 analyzes the operation detection signal input from the operation unit 11 to identify operation content of the user. Also, the control unit 6 notifies the vehicle equipment 3 of the identified operation content by the BT communication in a state where the BT communication is enabled between the BT communication unit 8 and the BT communication unit 15 of the vehicle equipment 3 which will be described later.

When the mobile communication terminal 2 operates as a stand-alone telephone, that is, when the mobile communication terminal 2 is in a stand-alone call state (that is, not in a hands-free calling state which will be described later), the voice input unit 12 receives a voice generated by the user as a transmitted voice. The transmitted voice is transmitted from the telephone communication unit 7 to a call partner over the communication network. When the mobile communication terminal 2 operates as a stand-alone telephone, that is, when the mobile communication terminal 2 is in a stand-alone call state, the voice output unit 13 outputs the voice received by the telephone communication unit 7 from the call partner through the communication network as a received voice.

The control unit 6 can execute various applications, and can execute an application for transferring voice data of an Internet radio received from the server 4 by the telephone communication unit 7 to the vehicle equipment 3, and an application for conducting an incoming call notification when the telephone communication unit 7 receives the incoming call (incoming telephone call, incoming data (including an incoming electronic mail)) from the communication network. Also, the applications executed by the control unit 6 include a cooperative application for allowing the mobile communication terminal 2 and the vehicle equipment 3 to provide a service in cooperation with each other, and a stand-alone application for allowing the mobile communication terminal 2 to provide the same service alone without cooperating with the vehicle equipment 3.

The control unit 6 has a foreground operation (FG) 6a and a background operation (BG) 6b as execution areas for executing those applications, and can execute the plural applications in the foreground operation 6a or the background operation 6b at the same time (in parallel). The foreground operation 6a is a so-called front surface in which information processing is advanced in a user visible state. The background operation 6b is a so-called rear surface in which the information processing is advanced in a user invisible state. One application is executable in the foreground operation 6a, and plural applications are executable in the background operation 6b. The control unit 6 enters an operation input of the application which is executed in the foreground operation 6a from the user by the operation unit 11, displays an image by the application on the display unit 9, or outputs a voice from the voice output unit 13.

The vehicle equipment 3 includes a control unit 14 (corresponding to the control device), a BT communication unit 15 (corresponding to the establishment request transmission device, the identification information receiving device, and the reproduction request transmission device), a storage unit 16, a display unit 17, an operation unit 18, a voice input unit 19, a voice output unit 20, a signal input unit 21, and a vehicle LAN communication unit 22. The control unit 14 includes a known microcomputer having a CPU, a RAM, a ROM, and an I/O bus. The control unit 14 executes a computer program stored in the ROM or the like to control the overall operation of the vehicle equipment 3 such as data communication processing or data management processing.

The BT communication unit 15 can connect a BT communication line as a short-range wireless communication line to the BT communication unit 8 of the mobile communication terminal 2, and conducts a BT communication in a connection state of the BT communication line. The BT communication unit 15 is configured to enable simultaneous connection of plural profiles defined by the communication standard of the BT, as in the BT communication unit 8 of the mobile communication terminal 2.

The storage unit 16 has a storage area that stores various pieces of data therein as in the storage unit 9 of the mobile communication terminal 2.

The display unit 17 is configured by, for example, a liquid crystal display or an organic EL display, and displays various information on the basis of a display instruction signal input from the control unit 14. The operation unit 18 includes a so-called touch panel which is touch switches formed on a display screen of the display unit 17, and various operation keys including switches mechanically disposed around or in the vicinity of the display unit 17. The operation unit 18 outputs an operation detection signal to the control unit 14 in response to user's operation of the operation keys. The control unit 14 analyzes the operation detection signal input from the operation unit 18 to identify operation content of the user. Also, the control unit 14 notifies the mobile communication terminal 2 of the identified operation content by the BT communication in a state where the BT communication is enabled between the BT communication unit 15 and the BT communication unit 8 of the mobile communication terminal 2 described above.

The voice input unit 19 inputs the voice generated by the user as a transmitted voice when the mobile communication terminal 2 and the vehicle equipment 3 are in the hands-free calling state. The transmitted voice is transferred from the BT communication unit 15 to the BT communication unit 8 of the mobile communication terminal 2, and transmitted from the telephone communication unit 7 to the call partner through the communication network. When the mobile communication terminal 2 and the vehicle equipment 3 are in the hands-free calling state, the voice output unit 20 outputs the voice received by the telephone communication unit 7 from the call partner through the communication network, and transferred to the BT communication unit 15 from the BT communication unit 8 of the mobile communication terminal 2 as a received voice.

The signal input unit 21 is connected to an ACC (accessory) switch (not shown) mounted in the vehicle, and outputs an ACC signal to the control unit 14 upon receiving the ACC signal from the ACC switch. The control unit 14 controls on/off operation of a power supply circuit (not shown) on the basis of on/off states of the ACC signal input from the signal input unit 21. That is, the control unit 14 turns on the power supply circuit to start the vehicle equipment 3 at timing when the ACC signal changes from off to on, and turns off the power supply circuit to stop the vehicle equipment 3 at timing when the ACC signal changes from on to off.

The vehicle LAN communication unit 22 is connected to a vehicle LAN 23 mounted in the vehicle, and conducts a data communication with various ECUs (electronic control units) 24 or various sensors 25 mounted in the vehicle over a vehicle LAN 23.

Figure 2:
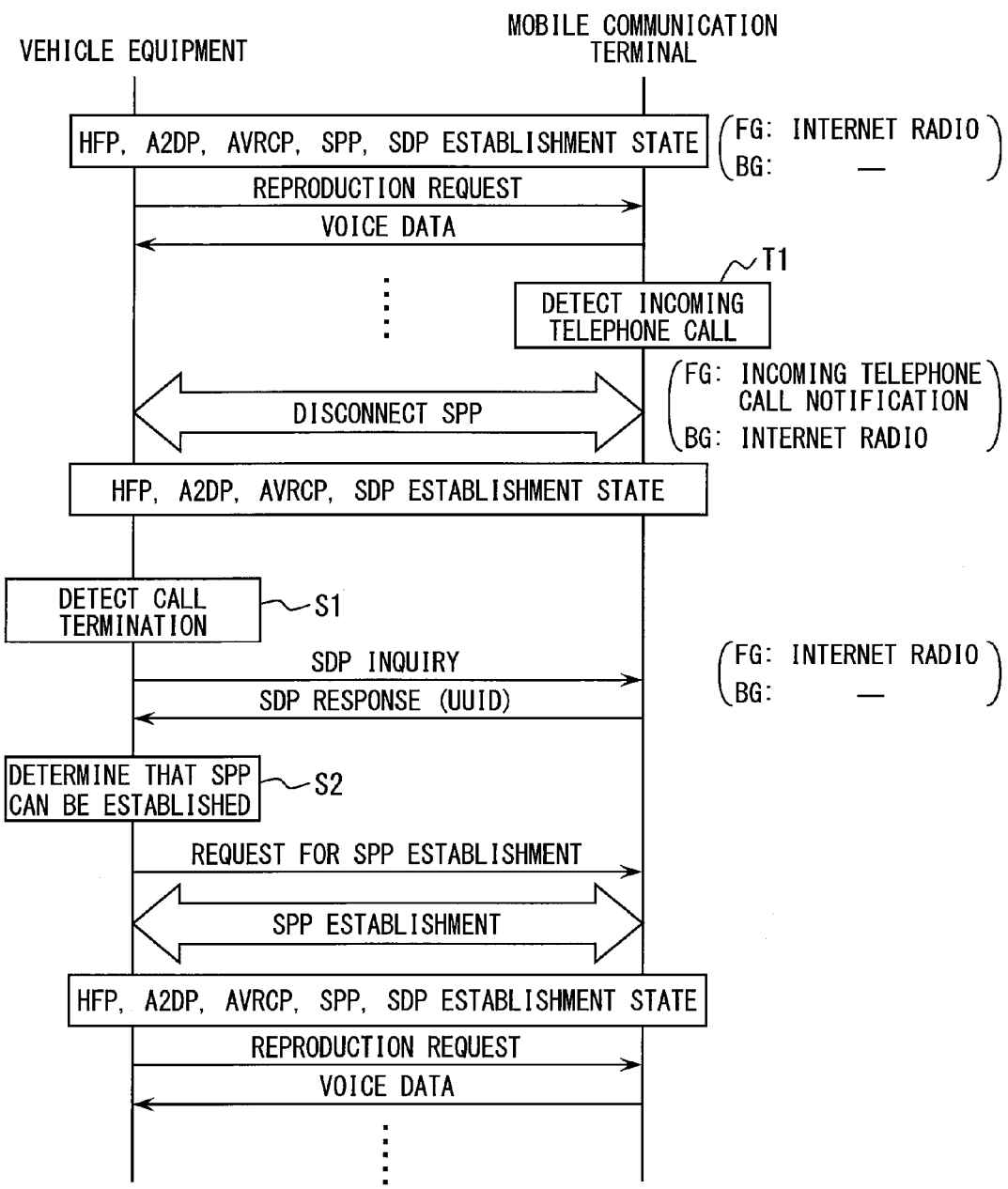
FIG. 2 is one sequence diagram.

Subsequently, the operation of the above configuration will be described with reference to FIGS. 2 to 4.

In the vehicle equipment 3, the control unit 14 connects the BT communication line between the BT communication unit 8 and the BT communication unit 15, and establishes the HFP, the A2DP, the AVRCP, the SPP, and the SDP. In a state where the application of the Internet radio is executed in the foreground operation 6a, when the user conducts, for example, the reproduction operation of the Internet radio by the operation unit 18, the control unit 14 transmits a reproduction request (reproduction command) from the BT communication unit 15 to the BT communication unit 8 according to the SPP.

In the mobile communication terminal 2, when the reproduction request is received by the BT communication unit 8, the control unit 6 reproduces the voice data of the Internet radio received by the telephone communication unit 7 from the server 4, and transmits the reproduced voice data to the BT communication unit 15 from the BT communication unit 8 according to the A2DP.

In the vehicle equipment 3, when the voice data is received by the BT communication unit 8, the control unit 14 outputs the received voice data from the voice output unit 20. That is, when the user conducts, for example, the reproduction operation of the Internet radio by the operation unit 18, the user can output the voice data of the Internet radio from the voice output unit 20, and can listen to the voice data of the Internet radio.

In this example, in the mobile communication terminal 2, when the telephone communication unit 7 detects the incoming telephone call from the communication network in the middle of transmitting the voice data of the Internet radio from the BT communication unit 8 to the BT communication unit 15 according to the A2DP (Step T1), the control unit 6 changes the application of the Internet radio executed in the foreground operation 6a up to then to the background operation 6b, and starts the application of the incoming telephone call notification to execute the application in the foreground operation 6a. Then, the control unit 6 changes the application of the Internet radio to the background operation 6b to disconnect the SPP (corresponding to the given protocol) used in the application of the Internet radio. The disconnection of the SPP by the control unit 6 as described above is caused by the restriction of the BT communication unit 15 in the vehicle equipment 3 such that the SPP is established only in the application running in the foreground operation 6a. Then, the control unit 6 disconnects the SPP, and also stops the output of the voice data from the voice output unit 20. That is, since the voice data of the Internet radio is not output from the voice output unit 20, the user cannot listen to the voice data of the Internet radio. On the other hand, the user conducts a response operation to the incoming telephone call by the operation unit 18, as a result of which the user can respond to the incoming telephone call, and can conduct the hands-free calling.

In the vehicle equipment 3, after the user conducts, for example, the response operation to the incoming telephone call through the operation unit 18 to respond to the incoming telephone call, the control unit 14 detects the termination of the hands-free calling by conducting the call end operation of the hands-free calling through the operation unit 18 (Step S1). Then, the control unit 14 transmits an SDP inquiry from the BT communication unit 15 to the BT communication unit 8 according to the SDP since a condition that the application of the Internet radio changed to the background operation returns to the foreground operation 6a in the mobile communication terminal 2 is likely to be satisfied. That is, the control unit 14 merely detects the termination of the hands-free calling, and there is really no technique of determining whether the application of the Internet radio returns to the foreground operation 6a, or not. Also, there is no technique of determining which application returns to the foreground operation 6a when the plural applications including the application of the Internet radio are executed in the background operation 6b. Under the circumstances, the control unit 14 transmits the SDP inquiry from the BT communication unit 15 to the BT communication unit 8 according to the SDP. This example shows a case in which the termination of the hands-free calling is detected. However, since the user may not conduct the response operation to the incoming telephone call, the control unit 14 similarly transmits the SDP inquiry from the BT communication unit 15 to the BT communication unit 8 according to the SDP in a case where the control unit 14 detects that the user conducts response refusal operation to the incoming telephone call, or in a case where the control unit 14 detects that the call is terminated without conducting the response operation or the response refusal operation to the incoming telephone call by the user.

In the mobile communication terminal 2, when the SDP inquiry is received by the BT communication unit 8, the control unit 6 transmits an SDP response that can identify a UUID (universally unique identifier) from the BT communication unit 8 to the BT communication unit 15 according to the SDP. The UUID represents information that can identify the application executed by the mobile communication terminal 2 in the foreground operation 6a. That is, if the application of the Internet radio changed to the background operation rapidly returns to the foreground operation 6a after the termination of the hands-free calling, at the time when the SDP inquiry is received in the BT communication unit 8, the control unit 6 transmits the UUID that can identify the application of the Internet radio from the BT communication unit 8 to the BT communication unit 15. On the other hand, unless the application of the Internet radio changed to the background operation returns to the foreground operation 6a after the termination of the hands-free calling, the control unit 6 does not transmit the UUID that can identify the application of the Internet radio from the BT communication unit 8 to the BT communication unit 15. That is, the control unit 6 does not transmit the UUID that can identify the application from the BT communication unit 8 to the BT communication unit 15 if it takes some time to actually return to the foreground operation even if the condition for returning to the foreground operation is satisfied, for example, due to the specification of the mobile communication terminal 2 or a relationship (adjustment) with another application.

In the vehicle equipment 3, when the SDP response is received by the BT communication unit 15, the control unit 14 determines which application the mobile communication terminal 2 executes in the foreground operation 6a according to the UUID identified by the received SDP response. In this example, as illustrated in FIG. 2, the application of the Internet radio rapidly returns to the foreground operation 6a after the termination of the hands-free calling. If the control unit 14 determines that the application of the Internet radio returns to the foreground operation 6a according to the UUID identified by the SDP response, the control unit 14 determines that the disconnected SPP can be established (Step S2), and transmits an SPP establishment request from the BT communication unit 15 to the BT communication unit 8 according to the SPP.

In the mobile communication terminal 2, when the SPP establishment request is received by the BT communication unit 8, the control unit 6 establishes the SPP between the BT communication unit 8 and the BT communication unit 15, and returns an establishment state of the profile to a state before the telephone communication unit 7 receives the incoming telephone call from the communication network. That is, after that, the user conducts, for example, the reproduction operation of the Internet radio by the operation unit 18 in the same manner as that before the telephone communication unit 7 receives the incoming telephone call from the communication network, to transmit the reproduction request to the BT communication unit 8 from the BT communication unit 15 according to the SPP. As a result, the user can output the voice data of the Internet radio from the voice output unit 20, and can listen to the voice data of the Internet radio. Even if the user does not conduct the reproduction operation of the Internet radio by the operation unit 18 after the SPP is established between the BT communication unit 8 and the BT communication unit 15, the control unit 6 may transmit the reproduction request from the BT communication unit 15 to the BT communication unit 8 according to the SPP (output of the voice data of the Internet radio may automatically return to the original).

Figure 3:
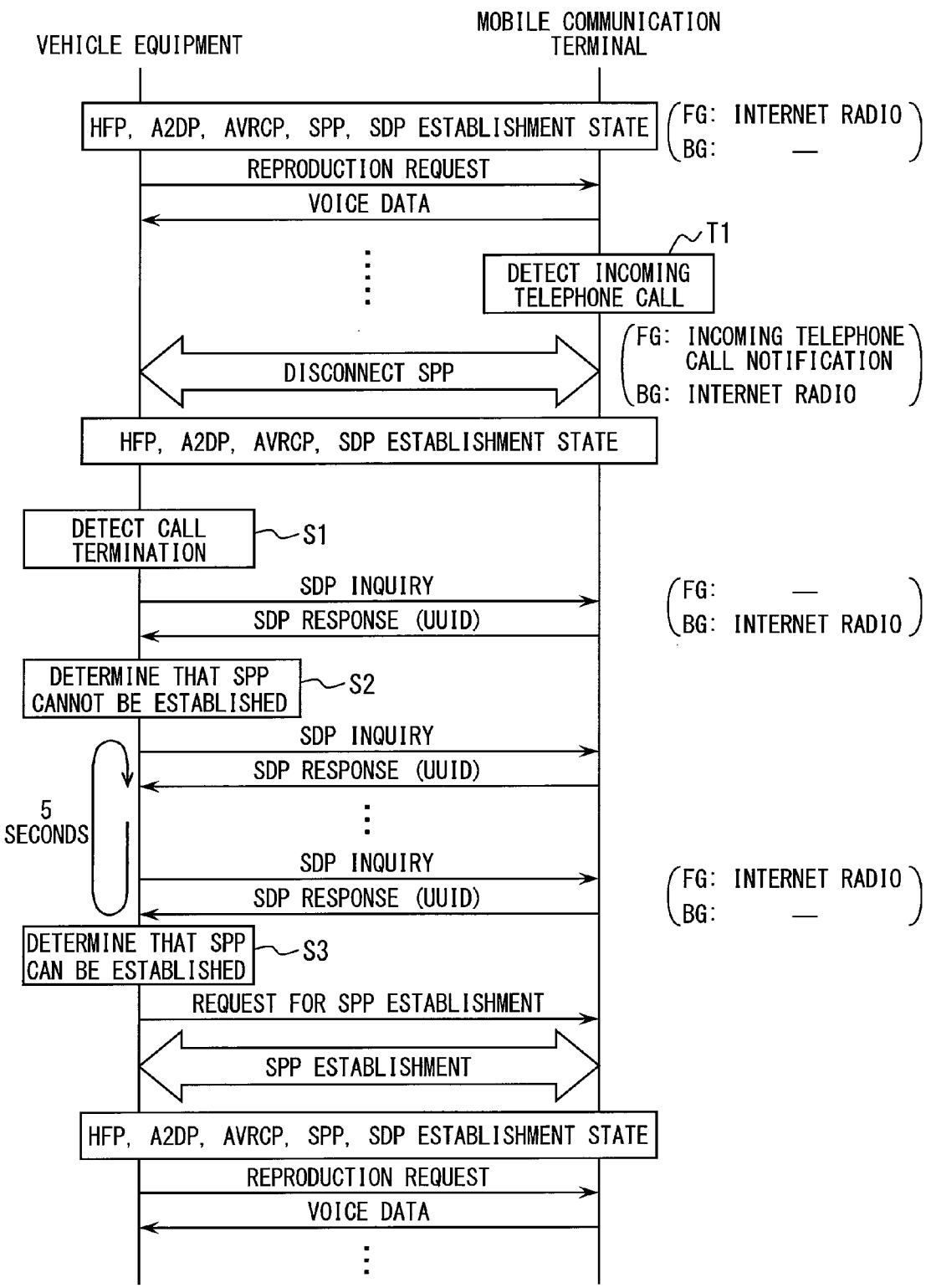
FIG. 3 is another sequence diagram.

On the other hand, in the vehicle equipment 3, as illustrated in FIG. 3, if the control unit 14 determines that the application of the Internet radio does not return to the foreground operation 6a according to the UUID identified by the SDP response, the control unit 14 determines that the disconnected SPP cannot be established (Step S2), and does not transmit the SPP establishment request from the BT communication unit 15 to the BT communication unit 8 according to the SPP. In this situation, if the control unit 14 thus determines that the disconnected SPP cannot be established, the control unit 14 thereafter again transmits the SDP inquiry from the BT communication unit 15 to the BT communication unit 8 according to the SDP.

Specifically, the control unit 14 periodically repeats the operation of transmitting the SDP inquiry (repetitively acquires the operating status of the application) at second given time (for example, 5 seconds) intervals until the control unit 14 determines that the application of the Internet radio returns to the foreground operation 6a, or until the control unit 14 determines that a first given time (for example, 30 seconds) elapses from a time point when the control unit 14 determines that the disconnected SPP cannot be established. In addition, if the control unit 14 determines that the application of the Internet radio returns to the foreground operation 6a before the first given time elapses from the time point of a first determination that the disconnected SPP cannot be established, the control unit 14 determines that the disconnected SPP can be established (Step S3), and transmits the SPP establishment request from the BT communication unit 15 to the BT communication unit 8 according to the SPP.

Even in this case, in the mobile communication terminal 2, when the SPP establishment request is received by the BT communication unit 8, the control unit 6 establishes the SPP between the BT communication unit 8 and the BT communication unit 15, and returns an establishment state of the profile to a state before the telephone communication unit 7 receives the incoming telephone call from the communication network. That is, the user conducts, for example, the reproduction operation of the Internet radio by the operation unit 18 in the same manner as that before the telephone communication unit 7 receives the incoming telephone call from the communication network, to transmit the reproduction request to the BT communication unit 8 from the BT communication unit 15 according to the SPP. As a result, the user can output the voice data of the Internet radio from the voice output unit 20, and can listen to the voice data of the Internet radio.

Figure 4:
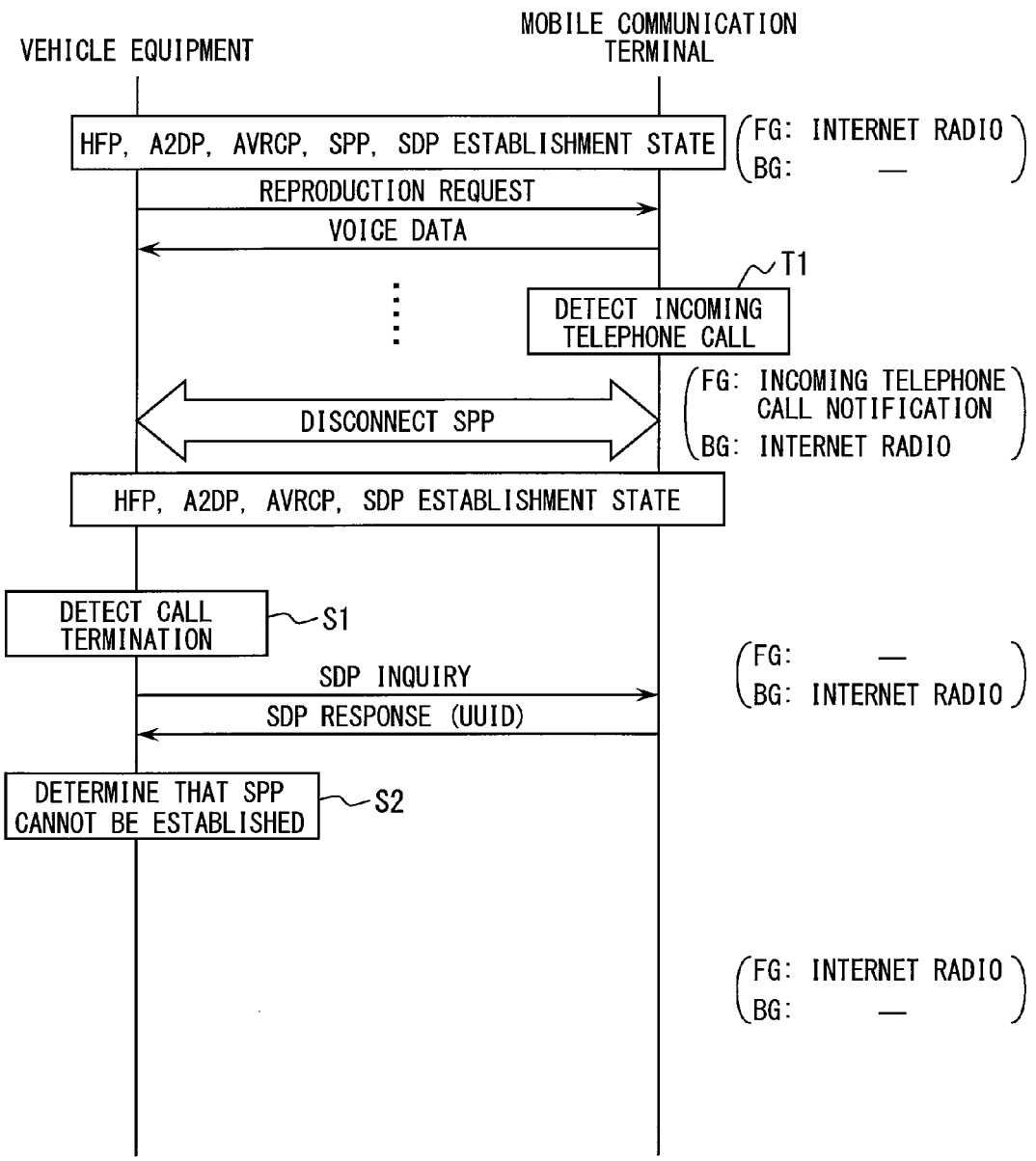
FIG. 4 is another sequence diagram.

In short, if the control unit 14 does not conduct the operation of again transmitting the SDP inquiry as illustrated in FIG. 4 after the control unit 14 determines that the disconnected SPP cannot be established, the control unit 14 thereafter has no chance of establishing the disconnected SPP because even if the application of the Internet radio returns to the foreground operation 6*a*, there is no chance of determining this fact. On the contrary, as illustrated in FIG. 3, the control unit 14 repetitively conducts the operation of again transmitting the SDP inquiry to obtain the chance of determining that the application of the Internet radio returns to the foreground operation 6*a*. As a result, the control unit 14 determines that the application of the Internet radio returns to the foreground operation 6*a* to obtain the chance of establishing the disconnected SPP.

The above description has been given of a case in which, in the mobile communication terminal 2, the application of the Internet radio changes to the background operation 6*b* to disconnect only the SPP. However, when not only the SPP but also the A2DP are disconnected, if it is determined that the application of the Internet radio returns to the foreground operation 6*a* in the vehicle equipment 3, the SPP and the A2DP which have been disconnected are established.

As has been described above, according to this embodiment, in the vehicle equipment 3, the termination of the hands-free calling is detected after the mobile communication terminal 2 receives the incoming telephone call to change the application of the Internet radio running in the foreground operation 6*a* to the background operation 6*b* in the mobile communication terminal 2. If it is determined that the condition that the application returns to the foreground operation 6*a* is satisfied, but it is determined that the application does not return to the foreground operation 6*a*, the UUID is repetitively acquired from the mobile communication terminal 2.

With the above configuration, the change of determining that the application of the Internet radio returns to the foreground operation 6*a* can increase. If it is determined that the application of the Internet radio returns to the foreground operation 6*a*, the SPP establishment request can be transmitted to the mobile communication terminal 2. If the disconnected SPP is again established, the application of the Internet radio can appropriately resume.

Also, when an upper limit is set for a period during which the SDP inquiry is repetitively transmitted, if the application of the Internet radio remains in the background operation 6*b* (does not return to the foreground operation 6*a*), for example, due to the specification of the mobile communication terminal 2, or a fact that another application changes to the foreground operation 6*a*, the transmission of the SDP inquiry can be avoided from being unnecessarily continued.

This disclosure is not limited to only the above embodiments, but can be modified or expanded as follows.

The opportunity that the cooperative application running in the foreground operation 6*a* changes to the background operation 6*b* is not limited to when the telephone communication unit 7 receives the incoming telephone calling from the communication network, but may be, for example, when the telephone communication unit 7 receives the incoming data from the communication network. For example, with the opportunity that the telephone communication unit 7 receives the incoming electronic mail from the communication network, the termination of browse or creation of an electronic mail is detected to conduct the same processing in Step S1.

The cooperative application conducted by the mobile communication terminal 2 in cooperation with the vehicle equipment 3 is not limited to the application that transfers the voice data of the Internet radio received from the server 4 by the telephone communication unit 7 to the vehicle equipment 3, but may be an application that transfers the voice data registered in the mobile communication terminal 2 to the vehicle equipment 3. Also the cooperative application may be applications for transferring texts such as news, still images such as photographs, or moving images such as movies which are distributed from the server 4 to the vehicle equipment 3.

The operation of again transmitting the SDP is not always conducted with the first given time as the upper limit, but may be conducted with a given number of times as the upper limit.

The mobile communication terminal 2 corresponds to the communication partner terminal, the vehicle equipment 3 corresponds to the short-range wireless communication device, the control unit 14 corresponds to the control device, and the BT communication unit 15 corresponds to the establishment request transmission device, the identification information receiving device, and the reproduction request transmission device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A short-range wireless communication device utilized together with a communication partner terminal that executes a cooperative application for providing a service in cooperation with the short-range wireless communication device while switching between a foreground operation and a background operation in a state where a predetermined protocol is established between the communication partner terminal and the short-range wireless communication device, and disconnects a predetermined established protocol by changing the cooperative application running in the foreground operation to the background operation, the short-range wireless communication device comprising:

a control device that
determines whether a condition having a possibility of returning the cooperative application changed to the background operation to the foreground operation in the communication partner terminal is satisfied,
determines whether the cooperative application returns to the foreground operation according to an operating status of an application in the communication partner terminal when the control device determines that the condition is satisfied, the operating status being acquired from the communication partner terminal, and
transmits a request for establishment of the predetermined protocol to the communication partner terminal through an establishment request transmission device when the control device determines that the cooperative application returns to the foreground operation, wherein, when the control device determines that the cooperative application does not return to the foreground operation, the control device repeatedly acquires the operating status from the communication partner terminal.

2. The short-range wireless communication device according to claim 1, wherein the control device repeatedly acquires the operating status of the application from the communication partner terminal within a predetermined time or a predetermined number of times as an upper limit.

3. The short-range wireless communication device according to claim 1 further comprising:

an identification information receiving device that receives identification information for identifying the application running in the foreground operation in the communication partner terminal, wherein the control device determines that the cooperative application returns to the foreground operation when the identification information received from the communication partner terminal by the identification information receiving device is identification information for identifying the cooperative application.

4. The short-range wireless communication device according to claim 1, wherein the short-range wireless communication device transfers data including any one of a voice, a text and an image to the communication partner terminal as the cooperative application.

5. The short-range wireless communication device according to claim 1, wherein the short-range wireless communication device transfers data including a voice to the communication partner terminal as the cooperative application, and wherein the control device transmits the request for establishment of the predetermined protocol through the establishment request transmission device to the communication partner terminal, and transmits a reproduction request for instructing the communication partner terminal to reproduce the data including the voice from a reproduction request transmission device to the communication partner terminal after transmitting the establishment request of the predetermined protocol through the establishment request transmission device to the communication partner terminal to establish the predetermined protocol.

6. The short-range wireless communication device according to claim 1, wherein the communication partner terminal changes the cooperative application running in the foreground operation to the background operation at a trigger that a request for starting another application is made while the cooperative application is running in the foreground operation.

7. The short-range wireless communication device according to claim 6, wherein the control device determines that the condition is satisfied when the control device determines a possibility that the another application is finished.

8. The short-range wireless communication device according to claim 7, wherein the communication partner terminal changes the cooperative application running in the foreground operation to the background operation at a trigger that a request for starting an application related to an incoming call from a communication network as the another application is made.

9. The short-range wireless communication device according to claim 8, wherein the control device determines a possibility that the application related to the incoming call from the communication network is finished when the control device determines that a call related to the incoming call from the communication network is finished, determines that a voice call or a data communication, which responds to the incoming call from the communication network, is finished, or determines that a response to the incoming call from the communication network is refused.

10. The short-range wireless communication device according to claim 8, wherein the control device transmits the request for establishment of the predetermined protocol to the communication partner terminal through the establishment request transmission device when the control device determines a possibility that the application related to the incoming call from the communication network is finished, and determines that the condition is satisfied.

11. The short-range wireless communication device according to claim 1, wherein a data communication profile defined by a communication standard of Bluetooth is utilized as the predetermined protocol.

* * * * *